(12) United States Patent
Jabbour et al.

(10) Patent No.: US 6,349,180 B1
(45) Date of Patent: Feb. 19, 2002

(54) CAMERA WITH FLEXIBLE SHELL

(75) Inventors: Edward Jabbour, New York; John L. Kempf, Manhasset; Patrick Jankowski, New York, all of NY (US)

(73) Assignee: The Tiffen Company LLC, Hauppauge, NY (US)

( * ) Notice: Subject to any disclaimer, the term of this patent is extended or adjusted under 35 U.S.C. 154(b) by 0 days.

(21) Appl. No.: 09/612,994

(22) Filed: Jul. 10, 2000

(51) Int. Cl.$^7$ ................................. G03B 17/02
(52) U.S. Cl. .................. 396/535; 396/502; 396/538; 206/316.2
(58) Field of Search ................ 396/25, 27, 28, 396/29, 535, 538, 502, 373; 348/81, 373; 206/316.2

(56) References Cited

U.S. PATENT DOCUMENTS

| | | | |
|---|---|---|---|
| 4,033,392 A | * | 7/1977 | Less .............................. 396/27 |
| 4,176,701 A | * | 12/1979 | Weigan .................... 206/316.2 |
| 4,917,241 A | | 4/1990 | Hanson |
| 4,927,017 A | | 5/1990 | Easter |
| 5,337,891 A | * | 8/1994 | Toth ........................ 206/316.2 |
| 5,348,206 A | | 9/1994 | Scherer |
| 5,689,735 A | * | 11/1997 | Horning et al. ................ 396/29 |
| 5,732,302 A | | 3/1998 | Yokota |
| 5,738,211 A | * | 4/1998 | Ichino et al. ............ 206/316.2 |
| 5,782,353 A | * | 7/1998 | Barclay et al. ................ 396/29 |
| 5,907,721 A | | 5/1999 | Schelling et al. |
| 6,014,522 A | | 1/2000 | Reber, III |

* cited by examiner

Primary Examiner—Alan A. Mathews
(74) Attorney, Agent, or Firm—Howell & Haferkamp LC

(57) ABSTRACT

A camera includes a flexible shell having at least one opening therein and a rigid camera body inside the shell, the camera body having an imaging opening aligned with the at least one opening in the shell.

20 Claims, 5 Drawing Sheets

CAMERA WITH FLEXIBLE SHELL

FIELD OF THE INVENTION

This invention relates to cameras, and in particular to a camera having a flexible shell.

BACKGROUND OF THE INVENTION

Cameras have been made out of a variety of materials and in a wide array of shapes and colors. However, a common feature of most cameras is a rigid body to protect the camera optics and mechanisms. Because of the precision with which even inexpensive cameras are made, cameras have been relatively fragile, and prone to damage if dropped. Further, despite some attempts to make cameras more interesting and fun in appearance, there have been few innovations in making cameras look and feel different and more interesting.

SUMMARY OF THE INVENTION

The present invention relates to a camera, and in particular to a camera with a flexible shell. This flexible shell can help protect the camera from damage and give the camera a unique and appealing look and feel. Generally, the camera of the present invention comprises a flexible shell having at least one opening therein, and a rigid camera body having an imaging opening, inside the flexible shell with the imaging opening aligned with the at least one opening in the flexible shell. The flexible shell is preferably at least translucent, and is more preferably transparent to give the camera a unique and distinctive appearance. The shell can be colorless or colored. If colored, the color of the rigid camera body and the shell can be coordinated or contrasting to provide a visually unique and appealing appearance. The flexible shell protects the rigid camera body, and gives the camera a unique and appealing feel as well. In the preferred embodiment the rigid camera body includes a shutter and a trigger mechanism, and the trigger mechanism is operated by deforming the flexible shell.

Thus, the camera of this invention is less prone to damage, and has a appearance and feel attractive to users. These and other features and advantages will be in part apparent, and in part pointed out hereinafter.

BRIEF DESCRIPTION OF THE DRAWINGS

Corresponding reference numerals represent corresponding parts throughout the several views of the drawings.

DETAILED DESCRIPTION OF THE DRAWINGS

Figure 1:
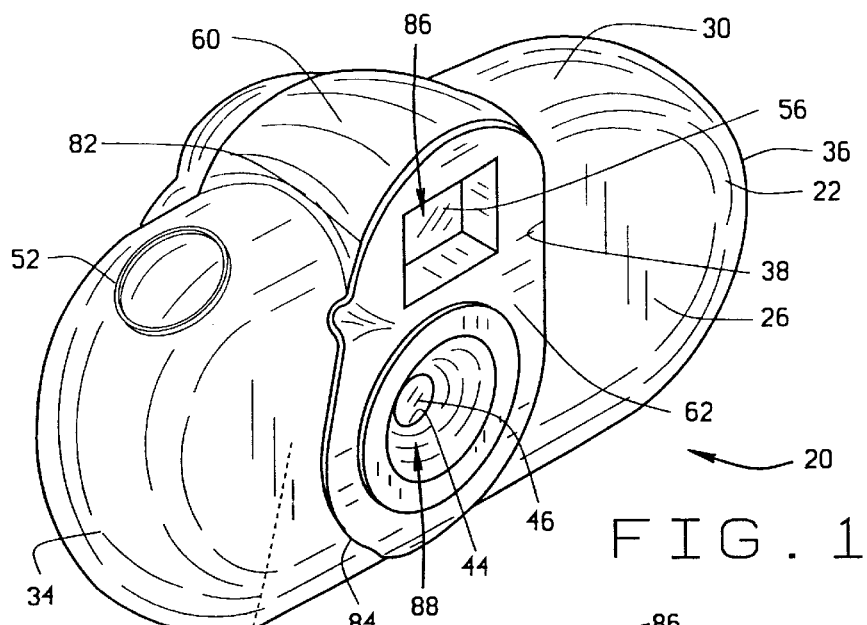
FIG. 1 is a perspective view of a camera with a flexible shell constructed according to the principles of this invention.
Figure 2:
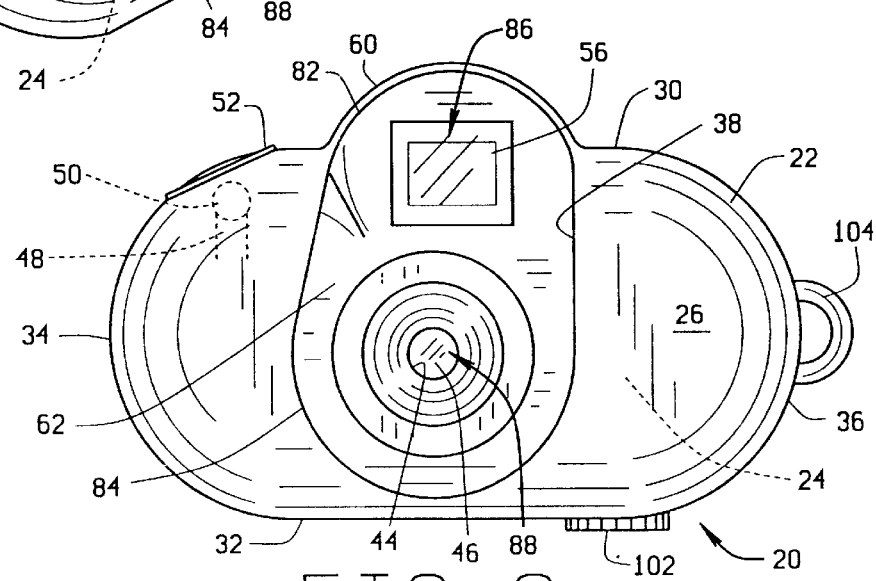
FIG. 2 is a front elevation view of the camera.
Figure 6:
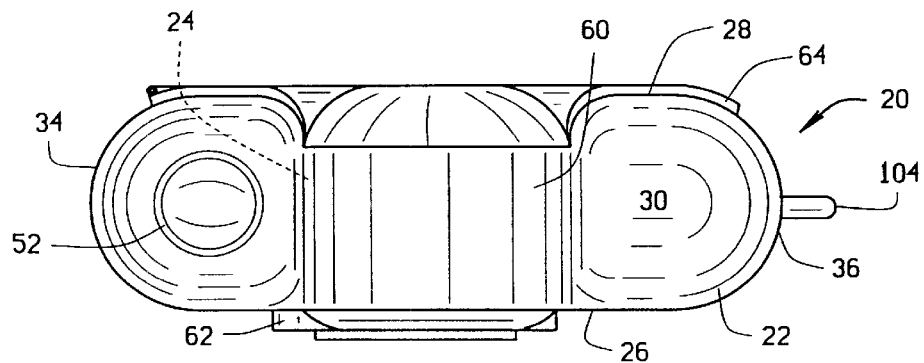
FIG. 6 is a top plan view of the camera.
Figure 3:
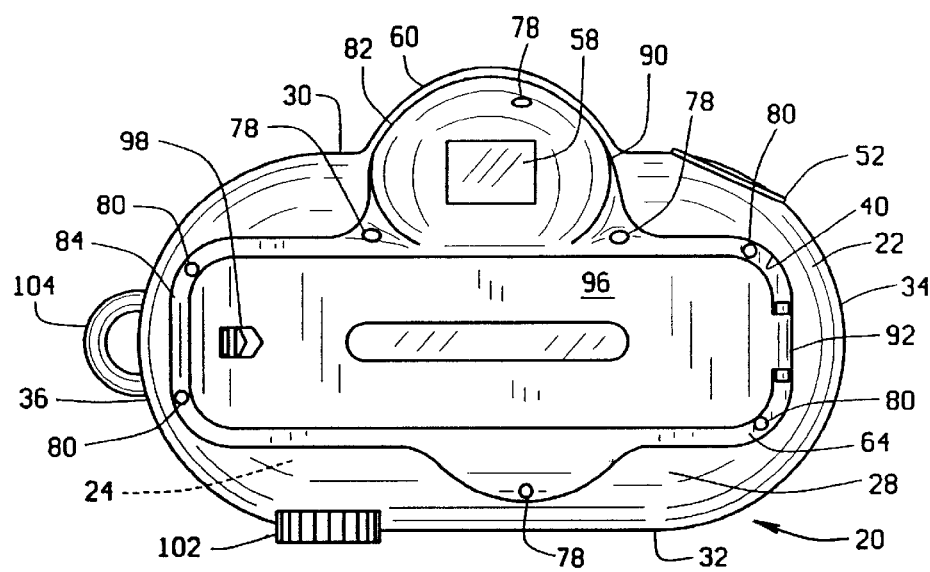
FIG. 3 is a back elevation view of the camera.
Figures 4, 5:
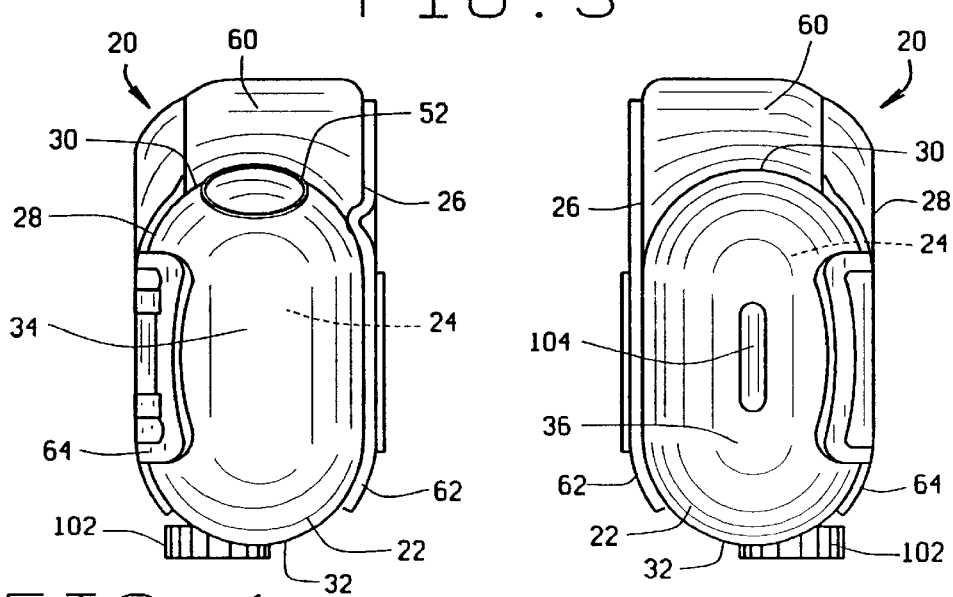
FIG. 4 is a left side elevation view of the camera.
FIG. 5 is a right side elevation view of the camera.
Figure 7:
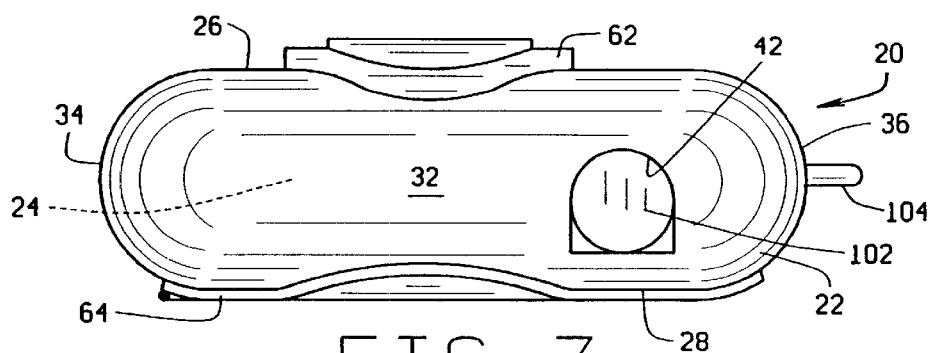
FIG. 7 is a bottom plan view of the camera.
Figure 8:
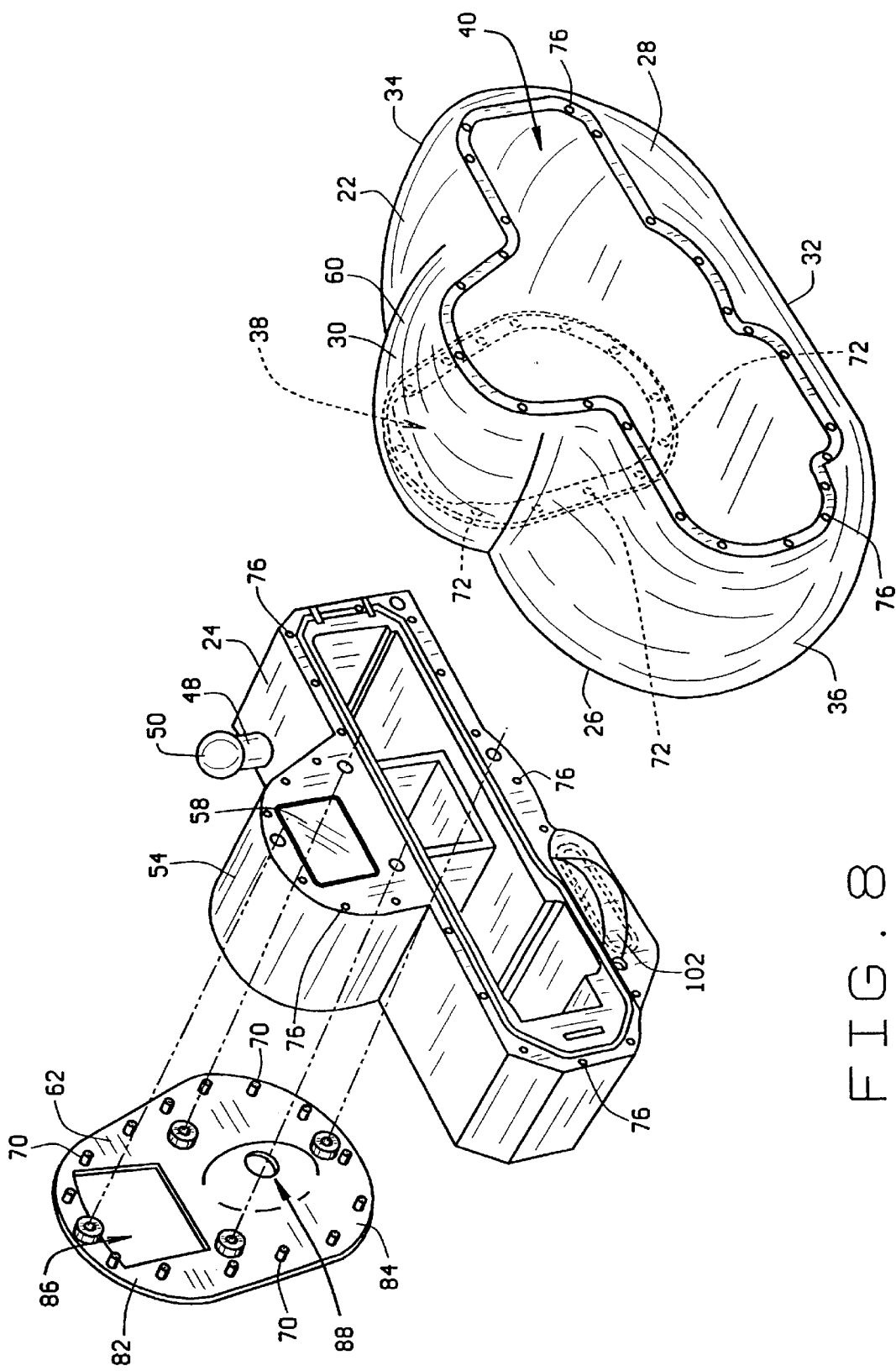
FIG. 8 is an exploded, perspective view of the flexible shell, the camera body and the front plate disassembled from each other.
Figure 9:
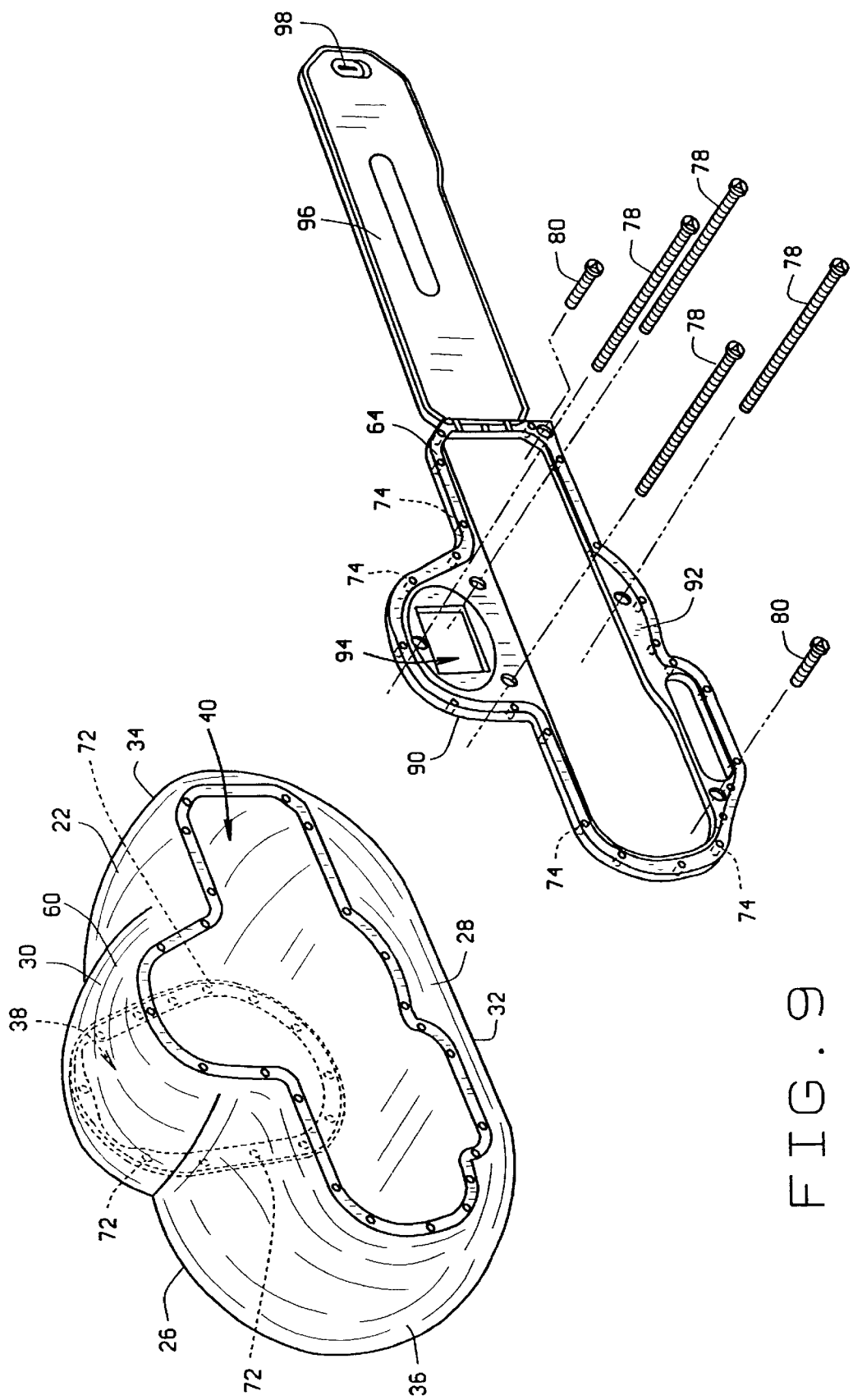
FIG. 9 is an exploded, perspective view of the flexible shell and the back plate disassembled from each other.
Figure 10:
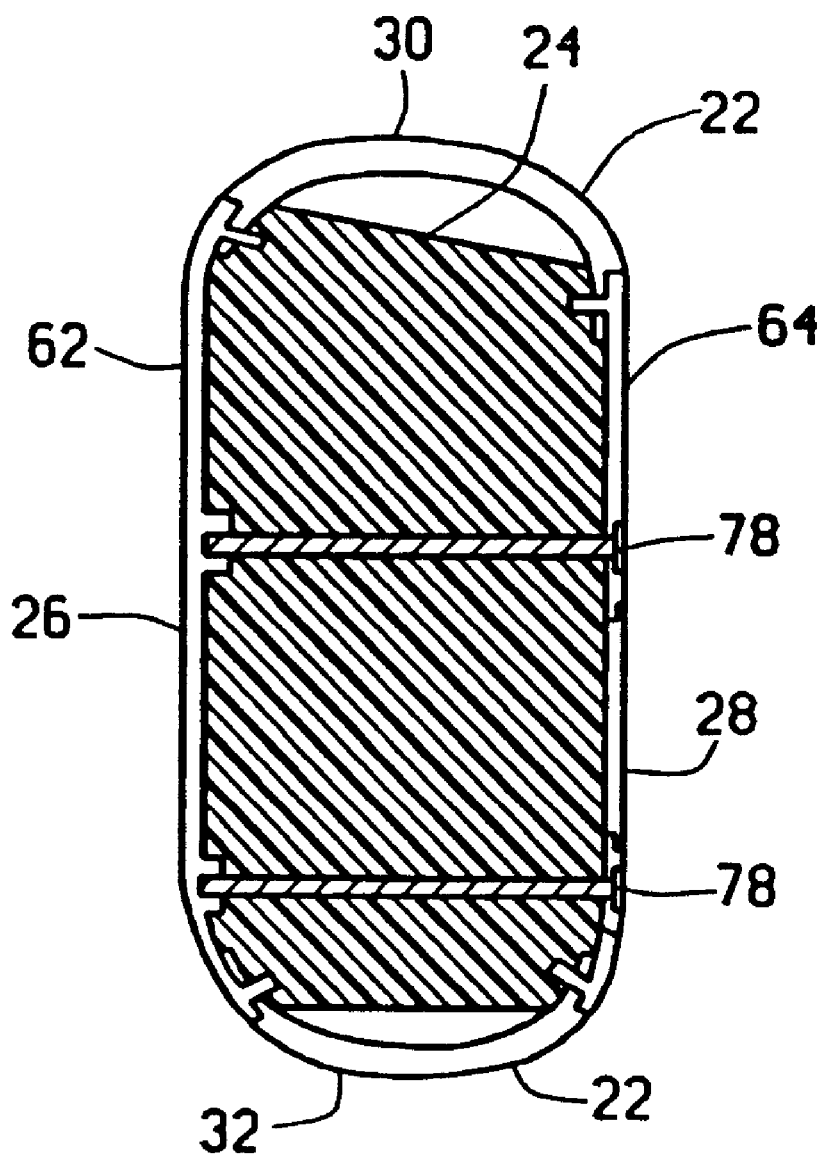
FIG. 10 is a cross-section of the flexible shell, the camera body, the front plate and the back plate.

A camera constructed according to the principles of this invention is indicated generally as 20 in FIGS. 1–7. The camera 20 comprises a flexible shell 22 having at least one opening therein, and a generally rigid camera body 24 inside the flexible shell.

The flexible shell 22 is preferably made from a flexible plastic material. The flexible shell 22 may be colorless, but is preferably colored. Further, the flexible shell 22 is preferably translucent, and more preferably transparent. The flexible shell 22 preferably has at least one opening therein. In the preferred embodiment, the flexible shell comprises a front 26, a back 28, a top 30, a bottom 32, and left and right sides 34 and 36. As shown in the Figures, the camera 20 preferably has a rounded, smoothly contoured appearance. There is an opening 38 in the front 26 of the flexible shell 22, and an opening 40 in the back 28 of the flexible shell. There may also be additional openings in the flexible shell 22, such as an opening 42 in the bottom 32 of the flexible shell 22, as described in more detail below.

The rigid camera body 24 is preferably made from a rigid opaque material such as a plastic, or other suitable material. The rigid camera body 24 contains optics and mechanisms for the camera. These may be the conventional optics and mechanisms for a film-type camera, such as a 110 or 126 file format, a 35 mm film format, or some other existing or future film format. The optics and mechanisms may also be the optics or mechanisms for a digital or filmless-type camera. The rigid camera body 24 preferably includes an imaging opening 44 having a lens 46. The camera preferably also includes a shutter mechanism, and an actuator for operating the shutter mechanism. The actuator preferably includes a rounded surface, and in this preferred embodiment the actuator includes an arm 48 with a spherical surface 50. The arm 48 is actuated by compressing the flexible shell 22. The smooth spherical surface 50 slides against the interior surface of the flexible shell 22, to minimize wear and abrasion on the inside surface of the flexible shell. A raised ring 52 can be formed on the exterior of the flexible shell over the spherical surface 50 of the actuator to indicate to the user where to depress the flexible shell to operate the camera 20.

The rigid camera body 24 preferably also includes a view finder 54. The view finder 54 has an opening 56 in the front face of the rigid camera body 24 generally aligned with the first opening 38 in the front 26 of the flexible shell 22, and an opening 58 in the back face of the rigid camera body generally aligned with the second opening 40 in the back 28 of the flexible shell. In the preferred embodiment, the view finder 54 is generally adjacent the top of the rigid camera body 24, and is accommodated by a bulbous projection 60 in the top of the flexible shell 22.

There is preferably an opening in the back of the rigid camera body 24 for loading film. As noted above, the camera of this invention need not necessarily be a film-type camera, although in the preferred embodiment shown and described here, the camera 20 is a film-type camera using conventional 110 film format cartridges.

As shown in the Figures, the rigid camera body 24 is located inside the shell 22. A front plate 62 is secured over the front of the rigid camera body 24, generally aligned with the first opening 38 in the front 26 of the flexible shell 22, sandwiching the edge margins of the first opening against the front of the rigid camera body. Similarly a back plate 64 is secured over the back of the rigid camera body 24, generally aligned with the second opening 40 in the back 28 of the flexible shell 22, sandwiching the edge margins of the second opening against the back of the rigid camera body. At least one of the front face of the rigid camera body 24 and the back face of the front plate 62 have a plurality of projecting pins 70 for engaging in holes 72 in the edge margins of the first opening 38 in the front of the flexible shell 22 and in holes of the other of the front face of the camera body 24 or the back face of the front plate 62. Similarly, at least one of the back face of the rigid camera body 24 and the front face of the back plate 64 have a plurality of protecting pins 74 for engaging in holes 76 in the edge margins of the second opening 40 in the back of the flexible shell 22 and in holes 76 of the other of the back face of the camera body or the back face of the back plate 64. A plurality of screws 78 extend through from the back plate 64 to the front plate 62 to secure the back plate, the back 28 of the flexible shell, the rigid camera body 24, the front 26 the flexible shell, and the front plate 62. Additional screws 80 can extend through the back plate 64, through the back 38 of the flexible shell 22, and into the back of the rigid camera body 24. The screws 78 and 80 are preferably in the back of the camera 20, so that they do not impair the appearance of the front of the camera.

In the preferred embodiment, the front plate 62 is shaped generally like a teardrop, with a narrow top section 82, and a bulbous bottom section 84. There is an opening 86 in the narrow top section 82, that aligns with the front opening 56 of the view finder, and an opening 88 in the bulbous bottom section that aligns with the imaging opening 46 in the rigid camera body 24. In the preferred embodiment, the back plate 64 is shaped like an inverted "T", with a centrally located tab 90 forming the stem of the "T", and a generally rectangular section 92 forming the arms of the "T". There is an opening 94 in the stem of the "T" that aligns with the back opening 58 of the view finder. There is a hinged door 96 in the rectangular section 92, with a latch 98, for loading filing into the camera.

There is a conventional winding mechanism that has a shaft (not shown) projecting through opening 42 in the bottom of the flexible shell 22. A ridged head 102 caps the shaft providing a way to operate the winding mechanism to advance the film.

A loop 104 can be formed integrally with the flexible plastic shell, so that the strap can be attached to the camera 20.

Operation

In operation, a 110 film cartridge is loaded in the camera 20 by releasing the latch 98 and opening the hinged door 96, placing the cartridge in the rigid camera body 24, and closing the door. The film is advanced to the first frame by turning the cap 102 until the winding mechanism locks. A picture is composed by viewing through the view finder, and the picture is taken by compressing the flexible shell 22 in the vicinity of the spherical surface 50 to operate the arm 48 to actuate the shutter mechanism. The picture taking process is repeated until the film is used up. The film can then be removed and processed.

The flexible shell 22 and the rigid camera body 24 define a chamber between them. This construction helps protect the camera mechanism and optics from damage. This construction also makes it easier to securely grasp the camera 20. The camera 20 is easy operated simply by squeezing the flexible shell. The shell construction allows the camera to be made in a wide array of interesting and attractive color combinations.

What is claimed is:

1. A camera comprising:
   a flexible shell having a front face and a back face, a first opening with edge margins in the front face and a second opening with edge margins in the back face;
   a rigid camera body in the shell, the camera body having a front face, a back face, a top, a bottom, and left and right sides, with an imaging opening on the front face, the edge margins of the first opening in the shell are secured to the front face of the camera body with the imaging opening generally aligned with the first opening and the edge margins of the second opening in the shell are secured to the back face of the camera body.

2. The camera according to claim 1 wherein the camera body further comprises an opening for loading film into the camera that is aligned with the second opening in the shell.

3. The camera according to claim 1 further comprising a view finder in the camera body, the view finder having an opening in the front of the camera body generally aligned with the first opening in the shell, and an opening in the back of the camera body generally aligned with the second opening in the shell.

4. The camera according to claim 1 wherein the flexible shell is translucent.

5. The camera according to claim 1 wherein the flexible shell is transparent.

6. The camera according to claim 1 wherein the camera body includes a shutter mechanism with a trigger inside the shell that is actuated by deforming the shell.

7. A camera comprising a rigid camera body having a front face, a back face, a top, a bottom, and left and right sides, an imaging opening on the front face and a view finder opening on the front face, a flexible shell surrounding and spaced from at least a portion of the top, bottom, left and right side, the shell and the camera body defining an enclosed space between them, the shell having a front opening with an edge margin and the edge margin is secured to the front face of the camera body around the imaging opening and the view finder opening.

8. The camera according to claim 7 wherein the flexible shell is translucent.

9. The camera according to claim 7 wherein the flexible shell is transparent.

10. The camera according to claim 7 wherein the shell has a back opening opposite the shell front opening with an edge margin around the back opening, and the back opening edge margin is secured to the back face of the camera body.

11. A camera comprising a flexible shell having a front face and a back face, with a first opening in the front face and a second opening in the back face; a rigid camera body inside the shell, the camera body having a front face and a back face, a front plate aligned with the first opening in the front face of the shell and secured to front face of the camera body sandwiching edge margins of the first opening against the camera body, and a back plate aligned with the second opening in the shell and secured to the back face of the camera body sandwiching edge margins of the second opening against the camera body.

12. The camera according to claim 11 wherein the flexible shell is translucent.

13. The camera according to claim 11 wherein the flexible shell is transparent.

14. The camera according to claim 11 wherein there are a plurality of holes in the edge margins of the first and second openings, and where there are a plurality of pins on at least one of the camera body and the plates extending into the openings and engaging the shell.

15. The camera according to claim 11 wherein the camera body further comprises an opening for loading film into the camera that is aligned with the second opening in the shell.

16. The camera according to claim 11 further comprising a view finder in the camera body, the view finder having an opening in the front of the camera body generally aligned with the first opening in the shell, and an opening in the back of the camera body generally aligned with the second opening in the shell.

17. A camera comprising a rigid camera body having a front face, a back face, a top, a bottom, and left and right sides, a view finder opening on the back face and a film loading opening on the back face; and a flexible shell surrounding and spaced from at least a portion of the top, bottom, left and right sides, the shell and camera body defining an enclosed space between them, the shell having a back opening with an edge margin around the back opening, and the edge margin is secured to the back face of the camera body around the view finder opening and the film loading opening.

18. The camera according to claim 17, wherein:

the shell has a front opening opposite the back opening with an edge margin around the front opening, and the front opening edge margin is secured to the front face of the camera body.

19. The camera according to claim 17, wherein the flexible shell is transparent.

20. The camera according to claim 17, wherein the camera body includes a shutter and a trigger for the shutter inside the shell, and wherein the trigger is operated by deforming the shell.

\* \* \* \* \*